US012615312B2

(12) United States Patent
Huang et al.

(10) Patent No.: US 12,615,312 B2
(45) Date of Patent: Apr. 28, 2026

(54) TRAIN DATA TRANSMISSION SYSTEM AND METHOD, APPARATUS, AND MEDIUM

(71) Applicant: WUYI UNIVERSITY, Jiangmen (CN)

(72) Inventors: Zundi Huang, Jiangmen (CN); Cheng Peng, Jiangmen (CN); Ning Chang, Jiangmen (CN); Mengcheng Tan, Jiangmen (CN); Zhenguo Xu, Jiangmen (CN); Hongbei Chen, Jiangmen (CN); Jiaming Xu, Jiangmen (CN); Tianrui Meng, Jiangmen (CN)

(73) Assignee: WUYI UNIVERSITY, Jiangmen (CN)

( * ) Notice: Subject to any disclaimer, the term of this patent is extended or adjusted under 35 U.S.C. 154(b) by 55 days.

(21) Appl. No.: 18/956,417

(22) Filed: Nov. 22, 2024

(65) Prior Publication Data

US 2025/0274516 A1     Aug. 28, 2025

(30) Foreign Application Priority Data

Feb. 26, 2024    (CN) ......................... 202410210038.5

(51) Int. Cl.
 *H04L 67/12*      (2022.01)
 *H04L 9/40*       (2022.01)
 *H04L 61/256*     (2022.01)

(52) U.S. Cl.
 CPC ............ *H04L 67/12* (2013.01); *H04L 61/256* (2013.01); *H04L 63/0428* (2013.01)

(58) Field of Classification Search
 CPC .... H04L 67/12; H04L 61/256; H04L 63/0428
 See application file for complete search history.

(56) References Cited

U.S. PATENT DOCUMENTS

| | | | | |
|---|---|---|---|---|
| 12,413,642 B2 * | 9/2025 | Mesde | ................ | H04L 41/0806 |
| 2020/0389469 A1 * | 12/2020 | Litichever | ............. | H04W 12/12 |
| 2024/0096139 A1 * | 3/2024 | Mesde | ............... | G06Q 30/0201 |
| 2025/0220080 A1 * | 7/2025 | Dattatraya | .............. | H04L 47/25 |

FOREIGN PATENT DOCUMENTS

| | | | | | |
|---|---|---|---|---|---|
| CN | 117749758 A | * | 3/2024 | | |
| WO | WO-2025103619 A1 | * | 5/2025 | ........... | H04L 67/562 |

* cited by examiner

*Primary Examiner* — Kostas J Katsikis
(74) *Attorney, Agent, or Firm* — Vivacqua Crane, PLLC

(57) ABSTRACT

A train data transmission system and method, an apparatus, and a medium are disclosed. The method includes: acquiring, by a train data acquisition device, train-related data; receiving the train-related data from an onboard central control device and forwarding the train-related data to a database server by a network address translation (NAT) server; and in response to a web server receiving access information of an access terminal accessing a web service port exposed by a public network, acquiring, by the web server, target data from the train-related data stored in the database server according to the access information; and receiving, by the access terminal, the target data from the web server.

10 Claims, 3 Drawing Sheets

TRAIN DATA TRANSMISSION SYSTEM AND METHOD, APPARATUS, AND MEDIUM

CROSS-REFERENCE TO RELATED APPLICATION

This application is based on and claims the benefit of priority from Chinese Patent Application No. 2024102100385, filed on Feb. 26, 2024, the entirety of which is incorporated by reference herein.

TECHNICAL FIELD

Embodiments of the present disclosure relate to the field of data transmission, and more particularly, to a train data transmission system and method, an apparatus, and a medium.

BACKGROUND

During the operation of trains, it is necessary to detect data through sensors and transmit the data via either wired or wireless transmission methods. The integration of Internet of Things (IoT) technology with train condition monitoring enables real-time and intelligent data monitoring and scheduling of the trains from a data center.

In most cases, the traditional data transmission of train-related research uses wired transmission methods, allowing real-time acquisition of train status data. However, these wired methods cannot overcome the physical location constraints in real-world environments. A few wireless data transmission methods have problems such as high data latency and data security issues.

SUMMARY

The following is a summary of the subject matter described in detail herein. This summary is not intended to limit the scope of protection of the claims.

The present disclosure aims to solve one of the technical problems in the existing technology at least to a certain extent. Embodiments of the present disclosure provide a train data transmission system and method, an apparatus, and a medium.

An embodiment of a first aspect of the present disclosure provides a train data transmission system, including:

a train data acquisition device configured to acquire train-related data;

an onboard central control device communicatively connected to the train data acquisition device;

a network address translation (NAT) server communicatively connected to the onboard central control device;

a data center including a web server and a database server, where the data center is bridged to the NAT server, the NAT server is configured to receive the train-related data from the onboard central control device and forward the train-related data to the database server, the database server is configured to store the train-related data, and the NAT server is configured to map a web service port of the web server to a public network; and an access terminal, where, in response to the web server receiving access information of the access terminal accessing a web service port exposed by the public network, the web server is configured to acquire target data from the train-related data stored in the database server according to the access information, and the access terminal is configured to receive the target data from the web server.

An embodiment of a second aspect of the present disclosure provides a train data transmission method, which is applied to the train data transmission system as described above, the method including:

acquiring, by the train data acquisition device, train-related data;

receiving the train-related data from the onboard central control device and forwarding the train-related data to the database server by the NAT server, such that the database server stores the train-related data; and in response to the web server receiving access information of the access terminal accessing the web service port exposed by the public network, acquiring, by the web server, target data from the train-related data stored in the database server according to the access information, and receiving, by the access terminal, the target data from the web server.

According to some embodiments of a second aspect of the present disclosure, acquiring, by the train data acquisition device, train-related data includes:

acquiring train physical parameters, current time and train information; and concatenating the train physical parameters, the current time and the train information to obtain train-related data.

According to some embodiments of a second aspect of the present disclosure, receiving the train-related data from the onboard central control device and forwarding the train-related data to the database server by the NAT server includes:

binary encoding the train-related data to generate message plaintext and encrypting the message plaintext according to a key to generate message ciphertext by the onboard central control device;

receiving the message ciphertext from the onboard central control device and forwarding the message ciphertext to the database server by the NAT server; and decrypting the message ciphertext according to the key to obtain the message plaintext and decoding the message plaintext to obtain the train-related data by the database server.

According to some embodiments of a second aspect of the present disclosure, before binary encoding the train-related data to generate message plaintext, the method further includes:

performing data transformation on the train-related data such that a length of the train-related data conforms to a preset length.

According to some embodiments of a second aspect of the present disclosure, before receiving the train-related data from the onboard central control device and forwarding the train-related data to the database server by the NAT server, the method further includes:

finding, by the data center, a bridge port of the NAT server according to a public network address of the NAT server; and establishing a persistent transmission control protocol (TCP) connection between a bridge port of the data center and the bridge port of the NAT server.

According to some embodiments of a second aspect of the present disclosure, receiving the train-related data from the onboard central control device and forwarding the train-related data to the database server by the NAT server includes:

listening for data by a data interaction port of the NAT server;

receiving, by the data interaction port of the NAT server, the train-related data from a data interaction port of the onboard central control device; and sending, by the data interaction port of the NAT server, the train-related data to a data interaction port of the database server.

According to some embodiments of a second aspect of the present disclosure, receiving, by the access terminal, the target data from the web server includes:

establishing a hypertext transfer protocol connection between the web server and the access terminal in response to the web server determining that the access information is valid;

sending, by a data interaction port of the web server, the target data to the access terminal; and receiving the target data by a data interaction port of the access terminal.

An embodiment of a third aspect of the present disclosure provides an electronic device, including: a memory, a processor, and a computer program stored in the memory and executable by the processor, where the computer program, when executed by the processor, causes the processor to implement the train data transmission method as described above.

An embodiment of a fourth aspect of the present disclosure provides a computer-readable storage medium storing computer-executable instructions for implementing the train data transmission method as described above.

The above scheme has at least the following beneficial effects. By introducing NAT networking to improve train data transmission, wireless transmission of train data is achieved, overcoming the limitations of physical locations in real-world environments. This effectively reduces public network transmission costs and enhances the real-time performance of data transmission. The NAT server records the IP addresses and port information of both the database server and the access terminal. Based on this mapping information, responses from the access terminal are correctly routed to the database server, establishing point-to-point communication between the database server and the port information, thereby enhancing the reliability of data transmission.

BRIEF DESCRIPTION OF DRAWINGS

The accompanying drawings are used to provide further understanding of the technical schemes of the present disclosure and constitute a part of the description. The accompanying drawings are used to explain the technical schemes of the present disclosure together with the embodiments of the present disclosure, and do not constitute a restriction on the technical schemes of the present disclosure.

DETAILED DESCRIPTION

In order to make the objectives, technical schemes and advantages of the present disclosure more apparent, the present disclosure is further described in detail in conjunction with the accompanying drawings and embodiments. It should be understood that the particular embodiments described herein are only intended to explain the present disclosure, and are not intended to limit the present disclosure.

It is to be noted that although a functional module division is shown in a schematic diagram of an apparatus and a logical order is shown in a flowchart, the steps shown or described may be executed, in some cases, with a different module division from that of the apparatus or in a different order from that in the flowchart. The terms such as "first" and "second" in the description, claims or above-mentioned drawings are intended to distinguish between similar objects and are not necessarily to describe a specific order or sequence.

The embodiments of the present disclosure will be further explained below with reference to the accompanying drawings.

In an embodiment of the present disclosure, a train data transmission system is provided.

Figure 1:
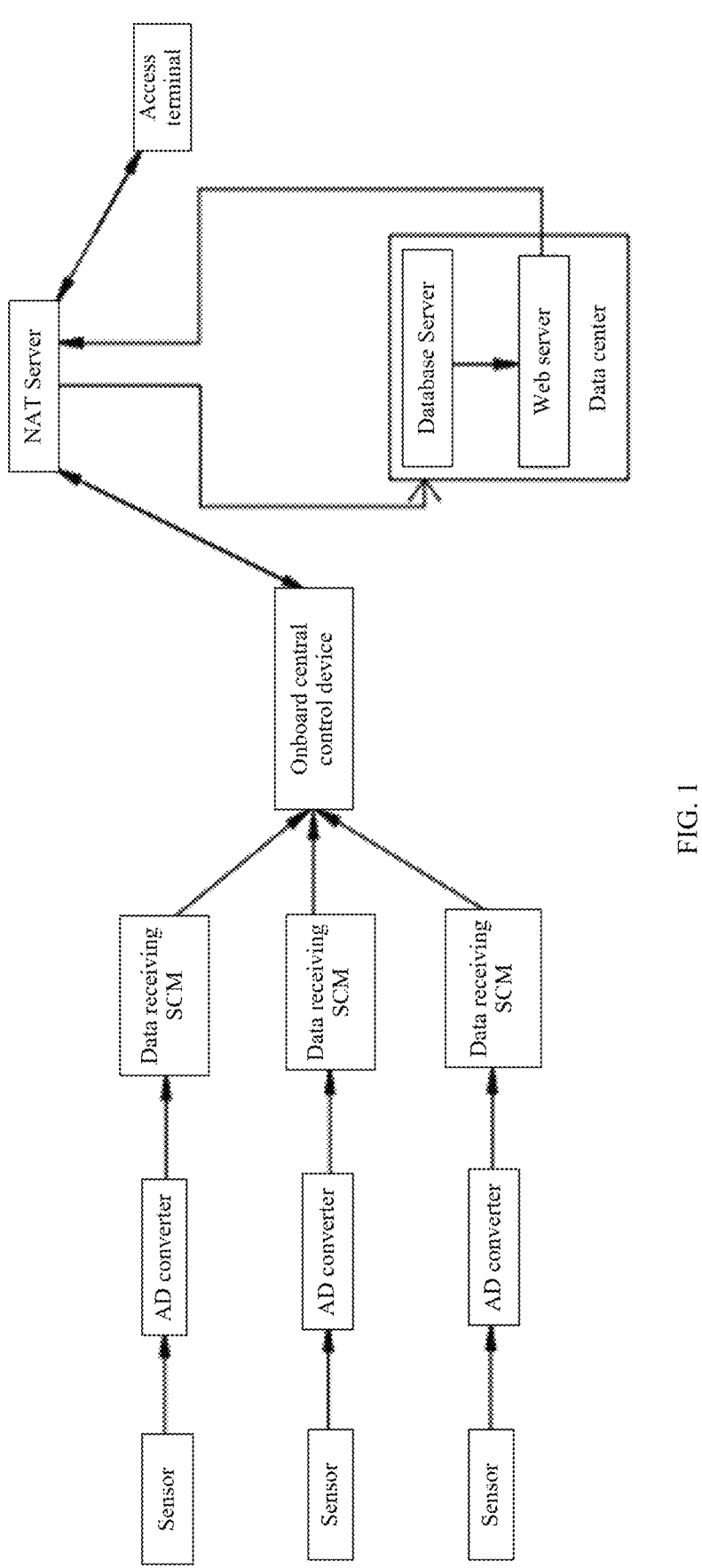
FIG. 1 is a schematic diagram of a train data transmission system.

Referring to FIG. 1, the train data transmission system includes: a train data acquisition device, an onboard central control device, a network address translation (NAT) server, a data center and an access terminal.

The train data acquisition device includes a plurality of sensors. The onboard central control device is connected to the sensors, and an AD converter and a data receiving single chip microcomputer (SCM) are arranged between the onboard central control device and the sensors.

The NAT server is communicatively connected to the onboard central control device, and the onboard central control device is communicatively connected to the train data acquisition device.

Herein, the train data acquisition device is configured to acquire train-related data; the AD converter is configured to convert the train-related data from analog signals to digital signals; the data center includes a web server and a database server, where the data center is bridged to the NAT server, the NAT server receives train-related data from the onboard central control device and forwards the train-related data to the database server, the database server stores the train-related data, and the NAT server maps a web service port of the web server to a public network; and in response to the web server receiving access information of the access terminal accessing the web service port exposed by the public network, the web server acquires target data from the train-related data stored in the database server according to the access information, and the access terminal receives the target data from the web server.

The train data transmission system applies the following train data transmission method.

At S100, train-related data is acquired by the train data acquisition device.

The train data acquisition device includes various sensors, a clock, a storage unit of a train database, etc.

Train physical parameters, such as speed and wind pressure, are acquired through the various sensors. The current time is acquired through the clock. Train information, such as the mass of the train, is acquired from the train database.

The sensors input the train physical parameters into the AD converter, and the AD converter converts the train physical parameters from analog signals to digital signals.

Train-related data are obtained by concatenating the train physical parameters, current time and train information.

Data transformation is performed on the train-related data such that the length of the train-related data conforms to a preset length.

At S200, the NAT server receives the train-related data from the onboard central control device and forwards the train-related data to the database server, and the database server stores the train-related data.

Figure 2:
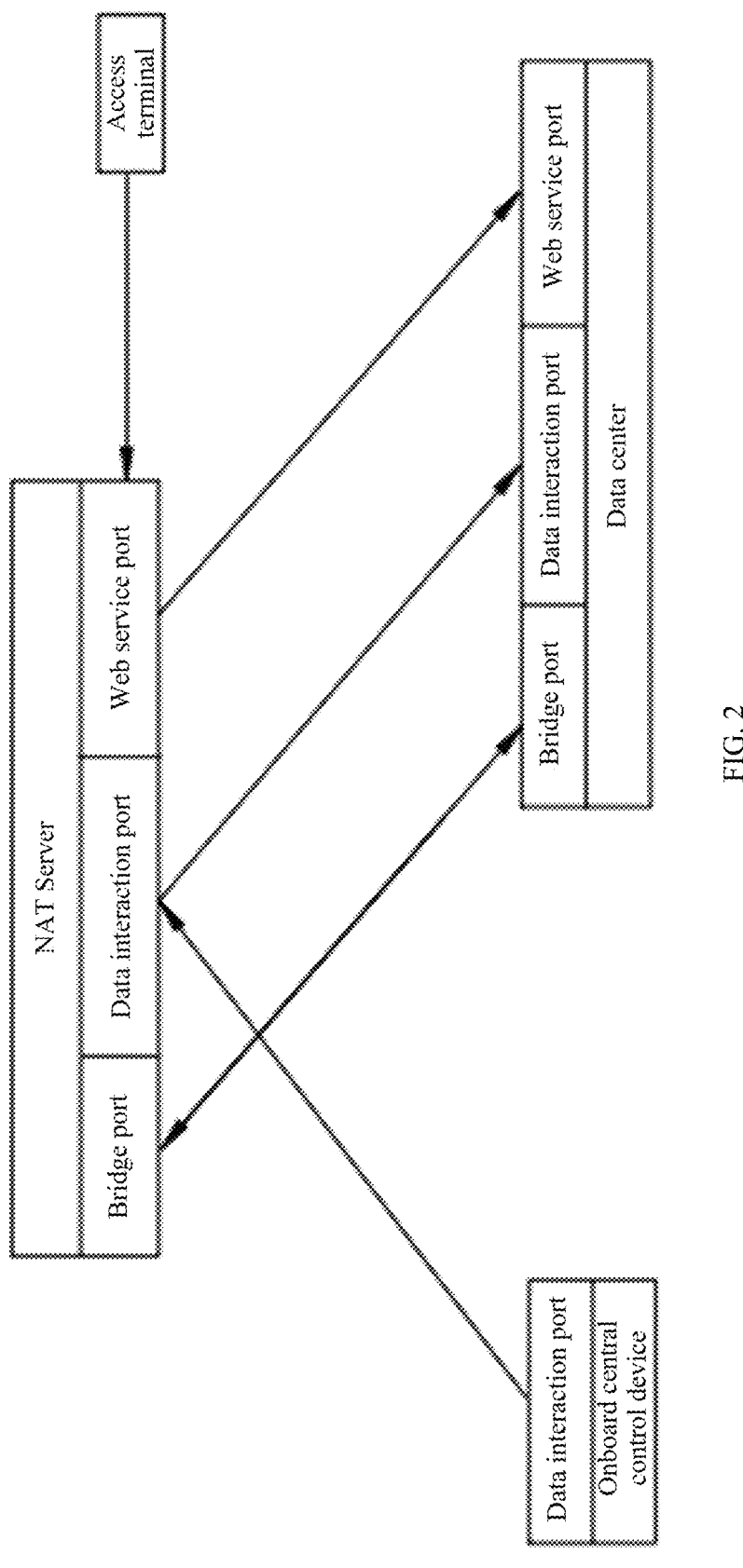
FIG. 2 is a schematic diagram of interaction of network address translation.

Referring to FIG. 2, the onboard central control device communicates with the NAT server through a communication module such as a 4G module. A connection is established between a data interaction port of the onboard central control device and a data interaction port of the NAT server.

The Network Address Translation (NAT) is a technology used to employ private addresses within a local network while utilizing a global IP address when connecting to the Internet. Its purpose is to convert IP addresses by mapping a single external IP address and port to a larger internal IP address set. NAT uses a traffic table to route traffic from an external IP address and port number to the correct internal IP address associated with an endpoint on the network. With NAT, when packets are sent from an internal network using private addresses through a router, these private addresses are converted into valid IP addresses. This allows a local area network to meet communication needs with the Internet using only a few IP addresses for all computers within the private address network. NAT will automatically modify the source and destination IP addresses of IP packets, and IP address verification is performed automatically during the NAT processing. Some applications embed the source IP address in the data portion of IP packets, so it is also necessary to modify the data portion of the packets to match the already modified source IP address in the IP header. Otherwise, the applications that embed IP addresses in the data portion of packets will not function properly.

The working process of NAT is as follows.

Identify internal and external networks: The internal network is a private network that contains multiple devices, each with its own internal IP address. The external network is a public network, such as the Internet, which has one or more public IP addresses.

Create NAT mapping table: The NAT device maintains a mapping table that records the relationship between internal IP addresses and external IP addresses.

Internal device sends request: When an internal device attempts to communicate with an external server, it creates a packet containing its internal IP address and port information.

NAT device modifies source address: The NAT device detects the outgoing packet from the internal device and modifies the source IP address and port information to the public IP address of the NAT device and a new port.

Update mapping table: The NAT device updates the mapping table to record the correspondence relationship between the internal IP address and port and the new public IP address and port.

Transmit packets to external network: The modified packet is sent to the external network, where the target server sees the public IP address and port of the NAT device.

External server responds: After receiving the packet, the external server sends response back to the public IP address and port of the NAT device.

NAT device restores address according to mapping table: The NAT device uses the mapping table to restore the destination IP address and port information of the external response back to the original IP address and port of the internal device.

Transmit packets to internal device: The NAT device finally transmits the response packet to the corresponding internal device.

Through the above process, NAT makes it possible for multiple internal devices to access external networks using a shared public IP address or a set of public IP addresses, while also providing a certain level of network security, as external networks cannot directly access the internal IP addresses of the internal devices.

A bridge port of the NAT server is found by the data center according to a public network address of the NAT server; and a persistent TCP connection is established between a bridge port of the data center and the bridge port of the NAT server, and two ports of the data center are exposed, namely: the data interaction port and the web service port of the database server.

Figure 3:
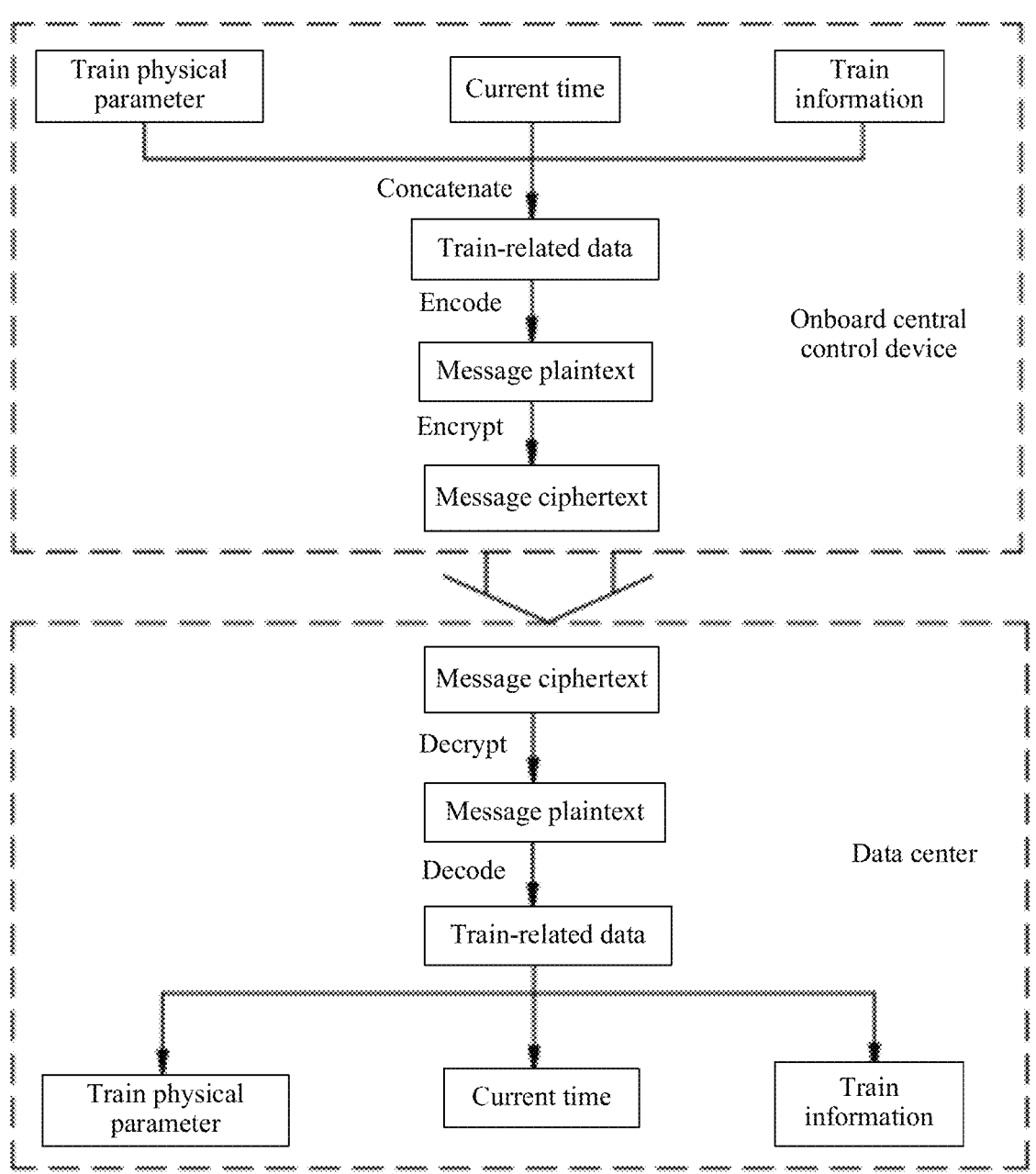
FIG. 3 is a schematic diagram of a process of encrypting data and decrypting data.

Referring to FIG. 3, the onboard central control device uses an encoding algorithm to binary encode the train-related data, converting the train-related data from a string data type to a binary data type to generate message plaintext; and generates an Advanced Encryption Standard (AES) key, and encrypts the message plaintext according to the AES key to generate message ciphertext.

AES is a symmetric encryption algorithm.

The encryption process of AES is as follows.

Key expansion: AES supports 128-bit, 192-bit, and 256-bit key lengths. Choosing a longer key length can enhance encryption security but also increases computational costs. For example, AES encrypts data in 128-bit (16-byte) blocks. If the data is not a multiple of 128 bits, padding is required. In order to generate these round keys, multiple XOR operations are usually required, and the specific number of rounds depends on the chosen key length. For example, a 128-bit key needs to undergo 10 rounds of expansion, a 192-bit key needs to undergo 12 rounds of expansion, and a 256-bit key needs to undergo 14 rounds of expansion.

Round transformation: During AES encryption, plaintext is divided into fixed-length blocks, such as 128 bits. These blocks are then subjected to a series of operations with individual round keys, including byte substitution, row shifting, and column mixing. These operations aim to create a complex encrypted ciphertext. Specifically, for byte substitution, each byte is replaced using a Substitution Box (S-box) to increase non-linearity. For row shifting, rows are cyclically shifted left according to fixed rules, creating confusion between different rows of data. For column mixing, the columns are mixed by matrix operations, which increases the complexity of the algorithm.

Round key addition: Each 128-bit block is XORed with the final round key to produce the final encrypted result.

It should be noted that AES does not directly use the round keys for encryption. Instead, it achieves this through a series of transformations and operations. In addition, each stage of AES can be reversed, allowing corresponding inverse functions to restore the original information during decryption.

For symmetric encryption algorithms, it means that the same key is used for both the encryption and decryption processes.

The data interaction port of the NAT server listens for data; the data interaction port of the NAT server receives the train-related data sent by the data interaction port of the onboard central control device; and the data interaction port of the NAT server sends the train-related data to the data interaction port of the database server. To ensure reliability, TCP protocol is used for transmission. To ensure high bandwidth, multi-threaded transmission is used.

The database server decrypts the message ciphertext according AES key to obtain the message plaintext, and decodes the message plaintext, converting the message of the binary data type into the string data type, thus obtaining the train-related data. The database server stores the train-related data.

To decrypt the message ciphertext using the AES key, the process is similar to encryption but employs inverse operations. In each round, the following operations are performed: round key addition, inverse byte substitution, inverse column mixing, and inverse row shifting.

At S300, in response to the web server receiving access information of the access terminal accessing the web service port exposed by the public network, the web server acquires target data from the train-related data stored in the database server according to the access information, and the access terminal receives the target data from the web server. Each 128-bit block is XORed with the final round key to produce the final message plaintext.

The access terminal sends access information to the NAT server according to the web service port exposed by the public network, and the NAT server then immediately forwards the access information to the web server of the data center to send the access information to the web server.

In response to the web server receiving access information of the access terminal accessing the web service port exposed by the public network, the web server acquires target data from the train-related data stored in the database server according to the access information.

A hypertext transfer protocol connection is established between the web server and the access terminal in response to the web server determining that the access information is valid.

The target data is sent to the access terminal through a data interaction port of the web server. The target data is received by a data interaction port of the access terminal, and the access terminal displays the target data.

In this embodiment, by introducing NAT networking to improve train data transmission, wireless transmission of train data is achieved, overcoming the limitations of physical locations in real-world environments. This effectively reduces public network transmission costs and enhances the real-time performance of data transmission. The NAT server records the IP addresses and port information of both the database server and the access terminal. Based on this mapping information, responses from the access terminal are correctly routed to the database server, establishing point-to-point communication between the database server and the port information, thereby enhancing the reliability of data transmission.

In an embodiment of the present disclosure, there is provided an electronic device. The electronic device includes: a memory, a processor, and a computer program stored in the memory and executable by the processor, where the computer program, when executed by the processor, causes the processor to implement the train data transmission method as described above.

The electronic device may be any intelligent terminal device, including computers or the like.

Generally speaking, for the hardware structure of the electronic device, the processor may be implemented by a general-purpose central processing unit (CPU), a microprocessor, an application-specific integrated circuit (ASIC), or one or more integrated circuits, and is used for executing related programs to implement the technical schemes provided by the embodiments of the present disclosure.

The memory may be implemented in forms such as a read-only memory (ROM), a static storage device, a dynamic storage device, or a random access memory (RAM). The memory may store an operating system and other applications, and when the technical schemes provided by the embodiments of the present specification are implemented by software or firmware, the related program code is stored in the memory and is called and executed by the processor to perform the method of the embodiments of the present disclosure.

An input/output interface is used to realize the input and output of information.

A communication interface is used to realize the communication and interaction between this device and other devices, and can realize the communication through wired methods (such as USB, network cables, etc.) or wireless methods (such as mobile networks, Wi-Fi, Bluetooth, etc.).

A bus transmits information between various components (such as the processor, memory, input/output interface, and communication interface) of the device. The processor, the memory, the input/output interface, and the communication interface communicate with each other within the device via the bus.

In an embodiment of the present disclosure, there is provided a computer-readable storage medium. The computer-readable storage medium stores computer-executable instructions for performing the train data transmission method as described above.

It can be understood by those of ordinary skill in the art that all or some of the steps of the methods and systems disclosed above may be implemented as software, firmware, hardware, and appropriate combinations thereof. Some or all of the physical components may be implemented as software executed by a processor, such as a central processing unit, a digital signal processor or a microprocessor, or as hardware, or as an integrated circuit, such as an application-specific integrated circuit. Such software may be distributed on computer-readable media, which may include computer-readable storage media (or non-transitory media) and communication media (or transitory media). As well known to those of ordinary skill in the art, the term computer-readable storage medium includes volatile and nonvolatile, removable and non-removable media implemented in any method or technique for storing information, such as computer-readable instructions, data structures, program modules or other data. A computer-readable storage medium includes but is not limited to a random access memory (RAM), a read-only memory (ROM), an electrically erasable programmable read-only memory (EEPROM), a flash memory or other memory techniques, a compact disc read-only memory (CD-ROM), a digital versatile disk (DVD) or other optical disk storage, a magnetic cassette, a magnetic tape, magnetic disk storage or other magnetic storage devices, or any other medium that can be used to store desired information and can be accessed by a computer. Furthermore, it is well known to those of ordinary skill in the art that communication media typically contain computer-readable instructions, data structures, program modules or other data in a modulated data signal such as a carrier wave or other transmission mechanism, and may include any information transmission media. In the "an foregoing description, the explanation with reference to the terms implementation/embodiment", "another implementation/embodiment" or "some implementations/embodiments", etc. means that specific features, structures, materials or characteristics described in connection with the embodiment(s) or example(s) are included in at least one embodiment or example of the present disclosure. In the description, the illustrative expressions of the above-mentioned terms do not necessarily refer to the same embodiments or examples. Moreover, the specific features, structures, materials or characteristics described can be combined in any one or more embodiments or examples in any suitable manner.

It can be understood by those of ordinary skill in the art that all or some of the steps of the methods, systems and functional modules/units in the devices disclosed above can be implemented as software, firmware, hardware and appropriate combinations thereof.

The above units described as separate components may or may not be physically separated, and the components displayed as units may or may not be physical units, that is, they may be located in one place or distributed to multiple network units. Some or all of the units can be selected according to actual needs to achieve the purpose of the embodiment.

In addition, the functional units in each embodiment of the present disclosure may be integrated into one processing unit, or each unit may be physically separate, or two or more units may be integrated into one unit. The integration unit can be realized either in the form of hardware or in the form of a software functional unit.

If the integrated units are implemented in the form of functional units of software and sold or used as independent products, they can be stored in a computer-readable storage medium. On the basis of such understanding, the substance or the parts that contribute to the existing technology or all or a part of the technical schemes of the present disclosure may be embodied in the form of a software product, which is stored in a storage medium and includes a number of instructions to cause a computer device (which can be a personal computer, a server, or a network device, etc.) to execute all or some of the steps of the method described in the embodiments of the present disclosure. The aforementioned storage medium includes various media that can store program codes, such as a USB flash drive, a mobile hard disk, a read-only memory (ROM), a random access memory (RAM), a magnetic disk or an optical disk.

In the embodiments provided by the present disclosure, it should be understood that the disclosed device and method can be realized in alternative ways. For example, the device embodiments described above are only for illustration. For example, the division of the units is only a logic function division. In actual implementation, there may be alternative manners for the division, for example, multiple units or components may be combined or integrated into another system, or some features may be omitted or not implemented. Further, the mutual coupling or direct coupling or communication connection shown or discussed may be indirect coupling or communication connection through some interfaces, devices or units, and may be in electrical, mechanical or other forms. Although the embodiments of the present disclosure have been shown and described, it can be understood by those of ordinary skill in the art that various changes, modifications, substitutions and variations may be made to these embodiments without departing from the principles and objectives of the present disclosure, and the scope of the present disclosure is defined by the claims and their equivalents.

The above is a detailed description of the preferred implementation of the present disclosure, but the present disclosure is not limited to the embodiments described above. Those of ordinary skill in the art can make various equivalent modifications or replacements without departing from the gist of the present disclosure, and these equivalent modifications or replacements are all included in the scope defined by the claims of the present disclosure.

What is claimed is:

1. A train data transmission system, comprising:
   a train data acquisition device configured to acquire train-related data;
   an onboard central control device communicatively connected to the train data acquisition device;
   a network address translation (NAT) server communicatively connected to the onboard central control device;
   a data center comprising a web server and a database server, wherein the data center is bridged to the NAT server, the NAT server is configured to receive the train-related data from the onboard central control device and forward the train-related data to the database server, the database server is configured to store the train-related data, and the NAT server is configured to map a web service port of the web server to a public network; and
   an access terminal, wherein, in response to the web server receiving access information of the access terminal accessing a web service port exposed by the public network, the web server is configured to acquire target data from the train-related data stored in the database server according to the access information, and the access terminal is configured to receive the target data from the web server.

2. A train data transmission method, which is applied to the train data transmission system of claim 1, the method comprising:
   acquiring, by the train data acquisition device, train-related data;
   receiving the train-related data from the onboard central control device and forwarding the train-related data to the database server by the NAT server, such that the database server stores the train-related data; and
   in response to the web server receiving access information of the access terminal accessing the web service port exposed by the public network, acquiring, by the web server, target data from the train-related data stored in the database server according to the access information, and receiving, by the access terminal, the target data from the web server.

3. The train data transmission method of claim 2, wherein acquiring, by the train data acquisition device, train-related data comprises:
   acquiring train physical parameters, current time and train information; and
   concatenating the train physical parameters, the current time and the train information to obtain train-related data.

4. The train data transmission method of claim 2, wherein receiving the train-related data from the onboard central control device and forwarding the train-related data to the database server by the NAT server comprises:
   binary encoding the train-related data to generate message plaintext and encrypting the message plaintext according to a key to generate message ciphertext by the onboard central control device;
   receiving the message ciphertext from the onboard central control device and forwarding the message ciphertext to the database server by the NAT server; and
   decrypting the message ciphertext according to the key to obtain the message plaintext and decoding the message plaintext to obtain the train-related data by the database server.

5. The train data transmission method of claim 4, wherein before binary encoding the train-related data to generate message plaintext, the method further comprises:
   performing data transformation on the train-related data such that a length of the train-related data conforms to a preset length.

6. The train data transmission method of claim 2, wherein before receiving the train-related data from the onboard central control device and forwarding the train-related data to the database server by the NAT server, the method further comprises:

finding, by the data center, a bridge port of the NAT server according to a public network address of the NAT server; and establishing a persistent transmission control protocol (TCP) connection between a bridge port of the data center and the bridge port of the NAT server.

7. The train data transmission method of claim 2, wherein receiving the train-related data from the onboard central control device and forwarding the train-related data to the database server by the NAT server comprises:

listening for data by a data interaction port of the NAT server;

receiving, by the data interaction port of the NAT server, the train-related data from a data interaction port of the onboard central control device; and sending, by the data interaction port of the NAT server, the train-related data to a data interaction port of the database server.

8. The train data transmission method of claim 2, wherein receiving, by the access terminal, the target data from the web server comprises:

establishing a hypertext transfer protocol connection between the web server and the access terminal in response to the web server determining that the access information is valid;

sending, by a data interaction port of the web server, the target data to the access terminal; and receiving the target data by a data interaction port of the access terminal.

9. An electronic device, comprising: a memory, a processor, and a computer program stored in the memory and executable by the processor, wherein the computer program, when executed by the processor, causes the processor to implement the train data transmission method of claim 2.

10. A non-transitory computer-readable storage medium, storing computer-executable instructions for implementing the train data transmission method of claim 2.

* * * * *